(12) United States Patent
Steer

(10) Patent No.: US 7,134,815 B2
(45) Date of Patent: Nov. 14, 2006

(54) INTERCHANGEABLE HOLDER FOR HOLLOW DRILLS

(75) Inventor: Peter Steer, Munich (DE)

(73) Assignee: Bernd Schweiger, Munich (DE)

( * ) Notice: Subject to any disclaimer, the term of this patent is extended or adjusted under 35 U.S.C. 154(b) by 192 days.

(21) Appl. No.: 10/250,578

(22) PCT Filed: Jan. 2, 2002

(86) PCT No.: PCT/EP02/00004

§ 371 (c)(1),
(2), (4) Date: Jul. 3, 2003

(87) PCT Pub. No.: WO02/062512

PCT Pub. Date: Aug. 15, 2002

(65) Prior Publication Data

US 2004/0086347 A1    May 6, 2004

(30) Foreign Application Priority Data

Jan. 3, 2001    (DE) .............................. 101 00 027

(51) Int. Cl.
*B23B 51/04* (2006.01)
(52) U.S. Cl. .................................. 408/204; 408/239 R
(58) Field of Classification Search ................ 408/204, 408/206, 207, 209, 703, 238, 239 R
See application file for complete search history.

(56) References Cited

U.S. PATENT DOCUMENTS

| | | | | |
|---|---|---|---|---|
| 1,283,258 A | * | 10/1918 | Misener et al. ............ | 408/189 |
| 3,262,474 A | * | 7/1966 | Enders ........................ | 408/209 |
| 4,303,357 A | | 12/1981 | Makar | |
| 5,433,560 A | * | 7/1995 | Duncan ........................ | 408/206 |
| 5,556,399 A | * | 9/1996 | Huebner ........................ | 606/80 |
| 6,015,248 A | * | 1/2000 | Elliott et al. ................ | 408/204 |

FOREIGN PATENT DOCUMENTS

| | | | |
|---|---|---|---|
| DE | 2535112 | * | 2/1977 |
| DE | 3533929 A1 | * | 11/1986 |
| DE | 198 18 284 A1 | | 10/1998 |
| EP | 1260297 | * | 11/2002 |
| EP | 1275459 | * | 1/2003 |
| EP | 1356883 | * | 10/2003 |
| GB | 2 324 486 A | | 10/1998 |
| JP | 7-251311 | * | 10/1995 |
| JP | 8-90325 | * | 4/1996 |
| JP | 8-99208 | * | 4/1996 |
| JP | 8-108307 | * | 4/1996 |

(Continued)

*Primary Examiner*—Daniel W. Howell
(74) *Attorney, Agent, or Firm*—David S. Safran

(57) ABSTRACT

An interchangeable holder (1) for hollow drills, having a support element (4) for receiving a base end (11) of a drill rod (10) of the hollow drill on a front face, and a holding device (12) for a handle of the support element (4) on associated recesses (15) that are configured in the wall of the drill rod (10) on its base end (11). To provide a universal interchangeable holder on which drill rods with different diameters can be mounted, the support element (4) has a front-face annular rest zone (9) that receives drill rods (10; 10'; 10") with different diameters. A locking device (24), together with the holding device (12), is effective across the width of the annular rest zone (9) in order to maintain the respective drill rod (10; 10'; 10") placed on the rest zone (9) and held by the holding device (12) locked in a center position.

18 Claims, 4 Drawing Sheets

FOREIGN PATENT DOCUMENTS

| | | | |
|---|---:|---|---|
| JP | 9-1413 | * | 1/1997 |
| JP | 9-117814 | * | 5/1997 |
| JP | 10-29109 | * | 2/1998 |

* cited by examiner

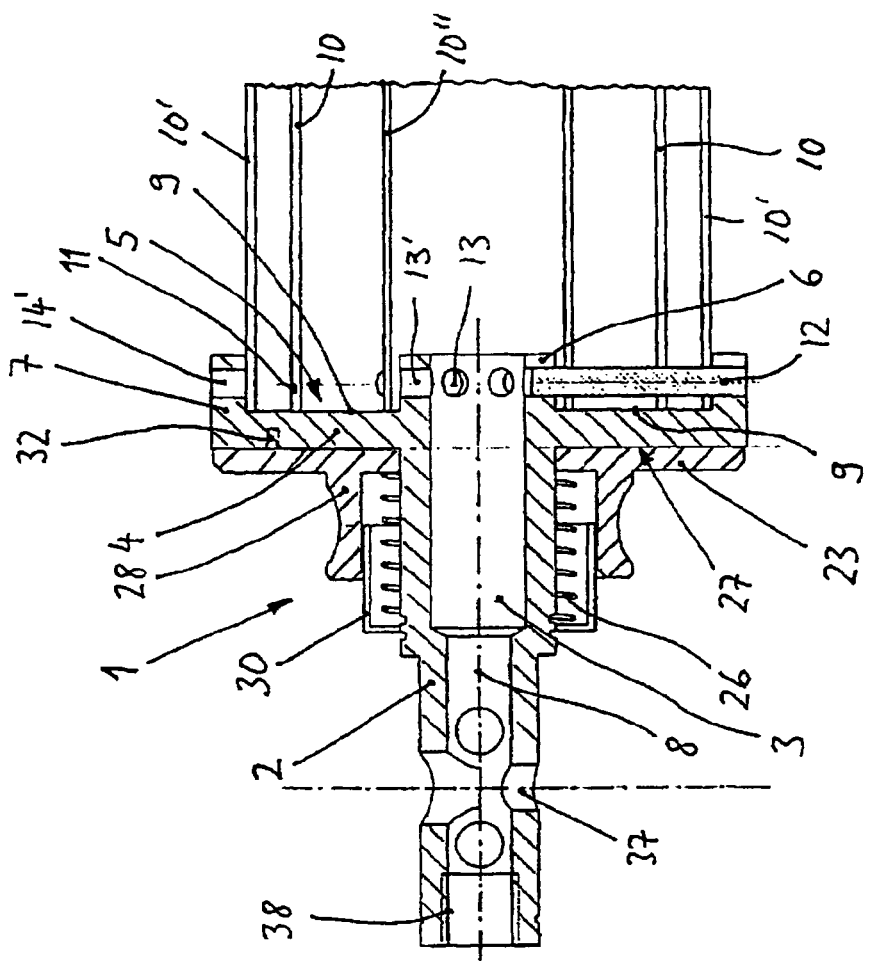
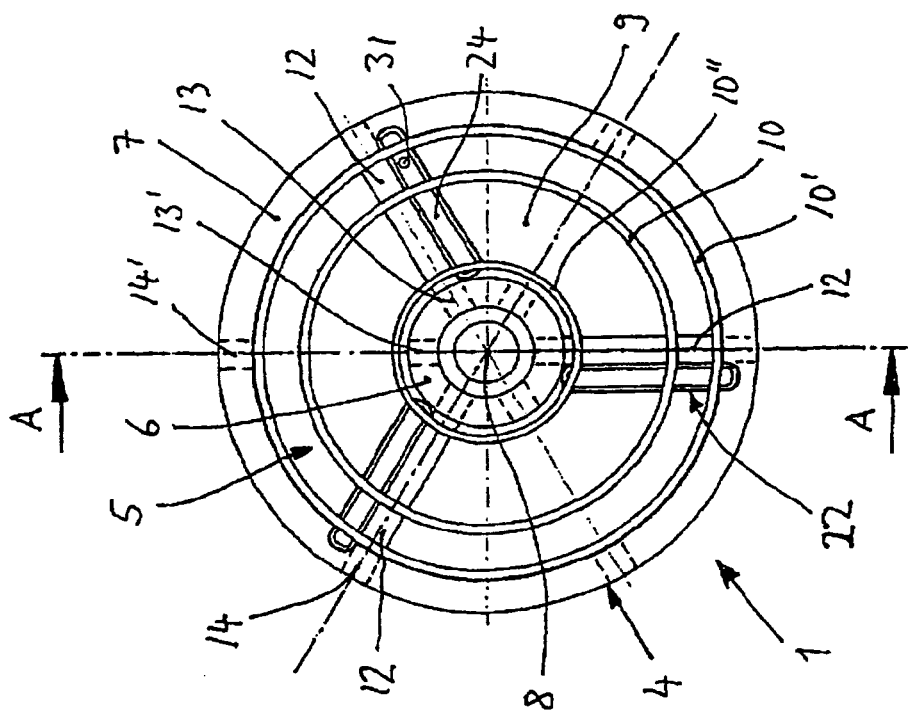
Fig. 2
Fig. 1

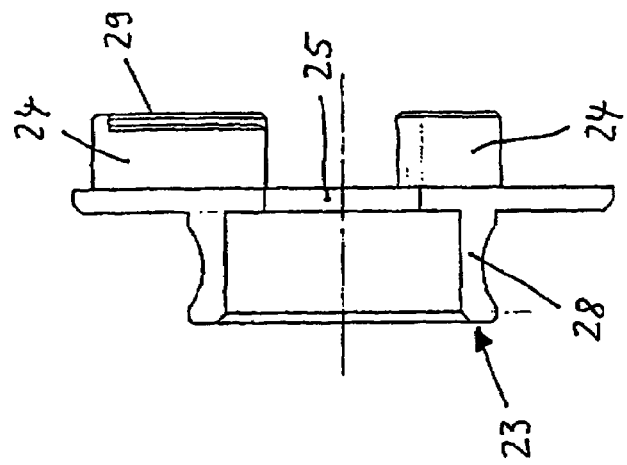
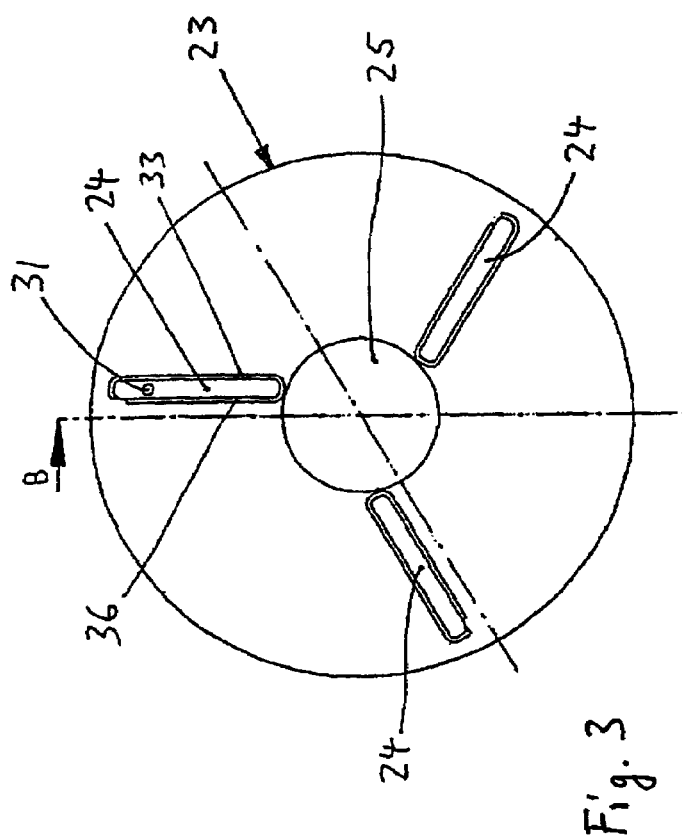
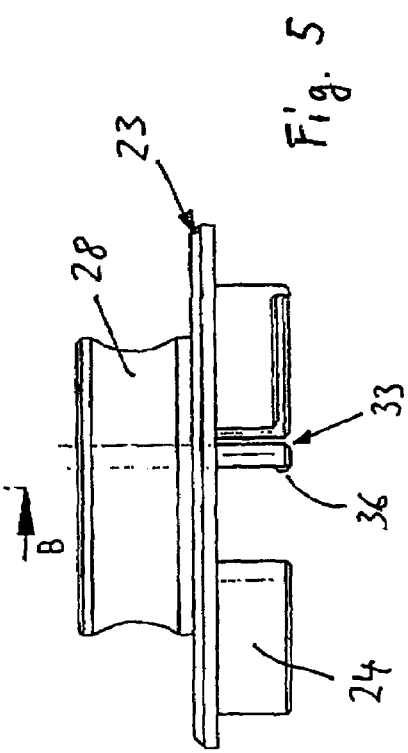

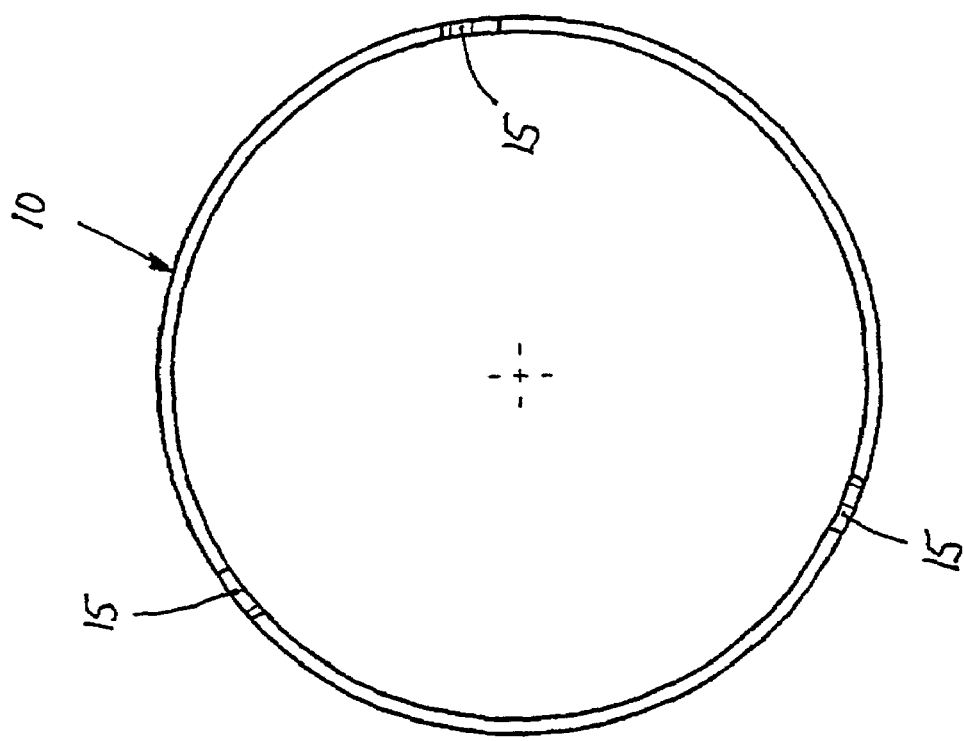
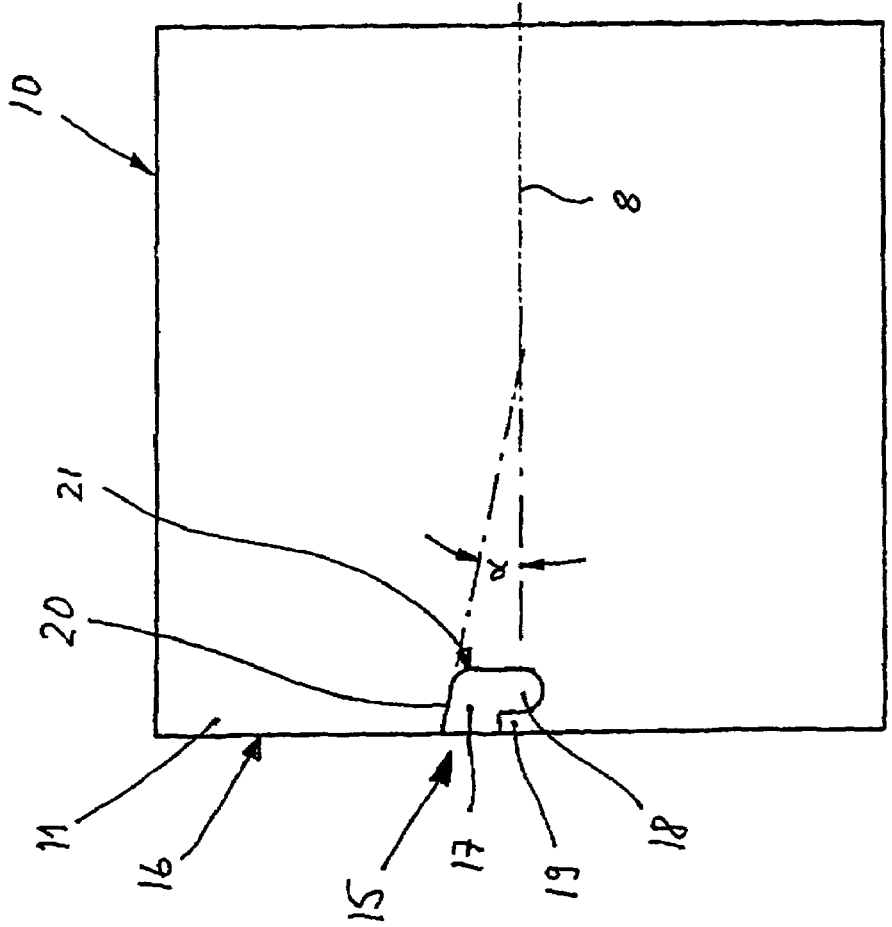

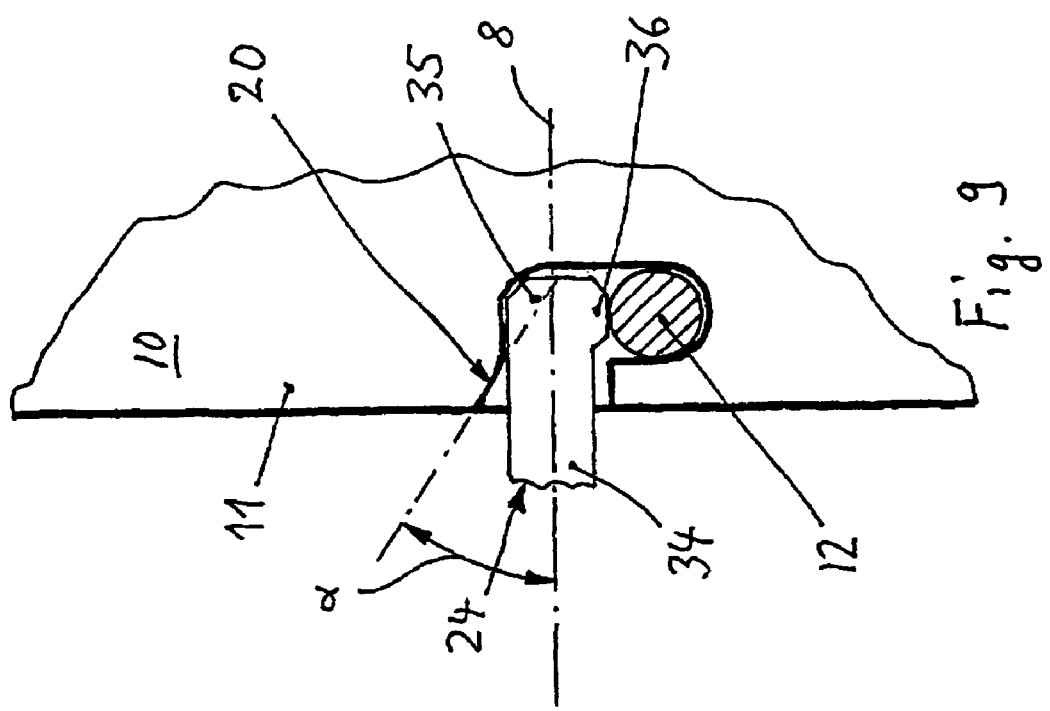
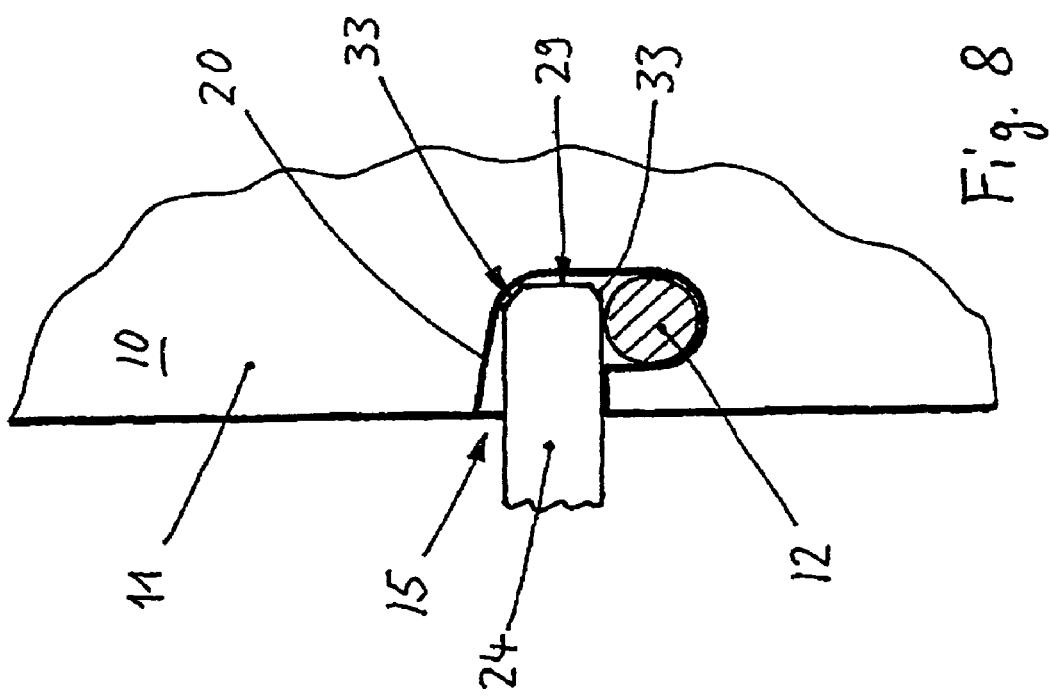

INTERCHANGEABLE HOLDER FOR HOLLOW DRILLS

BACKGROUND OF THE INVENTION

1. Filed of the Invention

The invention relates to an interchangeable holder for hollow drills, containing a carrier part for end accommodation of the base end of the drill rod of the hollow drill, and a holding means for retaining engagement of the carrier part on the assigned recesses which are made in the wall of the drill rod on its base end.

The invention also relates to a hollow drill for fixing on an interchangeable holder, the drill rod of the hollow drill having, on the base end opposite the drill tip, recesses for producing bayonet-like retaining engagement to a holding means of the interchangeable holder and each recess having an entry section for the holding means.

2. Description of Related Art

Published German Patent Application DE 198 18 284 A1 discloses a core cutting tool for masonry with a interchangeable holder which has a carrier disk with a central hollow journal which can be fixed on the hollow shaft which can be clamped in a drill chuck for driving the carrier disk. The carrier disk contains on its end face, which is opposite the journal, which is perpendicular to the axis of rotation, and which forms a contact surface for a hollow rod of the core cutting tool, an outer annular wall which is located on the periphery of the carrier disk, a middle annular wall which is located at a short distance from the outer wall, and an inner annular wall. Three holding pins run radially from the inner wall through the middle wall to the outer wall, their being located spaced apart from the end face and offset by 120° each against one another. The hollow rod contains, on its base end opposite the cutting teeth, three L-shaped slots which are located offset by 120° on the periphery of the hollow rod and with the holding pins of the hollow rod which adjoins the end face of the carrier disk form a quarter-turn fastener. Here, the inside of the hollow rod directly borders the outside of the middle annular wall and the brackets formed by the L-shaped slots press elastically against the outside of the middle annular wall so that the hollow rod is held centrally on the carrier disk. On the bracket a projection can be formed which can fit into the assigned recess in the outside of the middle annular wall and thus can form an interlock of the hollow rod on the carrier disk. This core cutting tool is designed to hold a hollow rod of a certain diameter which directly extends over the middle annular wall. There is no accommodation of hollow rods with diameters which differ arbitrarily within a range and due to the type of interlocking of the brackets which require direct contact against the outside of the middle annular wall, there can be no accommodation.

SUMMARY OF THE INVENTION

The object of the invention is to devise an interchangeable holder of the type mentioned initially which allows simple, centering attachment of the drill rods of drilling tools or cutting tools even with different diameters, and a hollow drill for this interchangeable holder.

This object is achieved in accordance with the invention in the aforementioned interchangeable holder in that the carrier part has an end annular contact area for accommodating drill rods with different diameters and that there is a locking means which, together with the holding means, is active over the width of the annular contact area in order to keep the drill rod, which is held by the holding means and which has been placed against the contact area, locked in the centered position. This configuration enables drill rods with different diameters to be detachably mounted on the interchangeable holder, the drill rods on their back connecting or base ends requiring, instead of complex coupling or adapter parts or the like, to simply have recesses formed in the wall for engaging the holding means. Thus, such a drill rod can be economically produced. Furthermore, such an interchangeable holder can be used for a larger range of drill diameters and drill rod diameters. Drill rods with diameters which are arbitrary within the allowable range can be kept centered and locked by the locking means which is provided on the carrier part. The interchangeable holder is generally suitable for any type of drilling and cutting tools, the term hollow drill for example also including compass saws.

One simple configuration calls for the holding means to have at least two, and especially three, roughly radially arranged holding pins for bayonet-like retaining engagement in the assigned recesses on the base end of the drill rod. For two holding pins located on a straight line, the drill rod must be separately centered when fixed. For three pins which are located radially relative to an axis of rotation, and especially at the same interval of 120° relative to one another, centering necessarily takes place when the drill rod is attached to the holding means or the holding pins. However, there can also be more than three holding pins or elements of the holding means which allow the drill rod to be centered and fixed.

Feasibly, the locking means for each holding pin contains a movable locking tooth, and the locking teeth for locking the drill rod which is held by the holding pins can be extended out into the recesses. The locking teeth which are located in the recesses prevent the drill rod from being able to turn relative to the holding pins. In this way, the drill rod is securely fixed. The locking teeth are formed, for example, as plates.

Preferably, each locking tooth is formed such that it extends roughly over the free length of the holding pin and can be extended through a slotted opening which has been formed in the contact surface of the carrier part in the axial direction into a position which borders the holding pin. The width of the opening is formed such that the locking tooth is guided almost without play in the opening. On the other hand, the opening can be wider than the shaft of the locking tooth so that the locking tooth with this play can be pushed in the opening such that it cannot be jammed by fine drilling material.

If the annular contact area or the annular end contact surface of the carrier part is bordered by an outer boundary and an inner boundary, the holding pins can each be supported on the outside boundary and the inside boundary and each locking tooth extends in an arrangement which is offset parallel to its holding pin roughly over the free length of the holding pin which is effective for the holding means.

The locking teeth can be supported to be able to move individually. Preferably however, the interchangeable holder contains a locking carrier which is supported to be axially movable on the central shaft of the carrier part and which contains the locking means or the axially projecting locking teeth. This facilitates handling of the interchangeable holder.

This locking carrier is feasibly elastically pre-tensioned against the carrier part in the locked position so that, for example, locking is facilitated by spring force.

If each locking tooth is rounded or beveled towards its end face, the locking tooth easily finds its locking engagement.

Movement into locking engagement is further supported if each recess on the drill rod has an entry section for the holding pin and the locking tooth and if the entry section has at least one side edge which is inclined towards the direction of motion of the locking tooth and which acts in the manner of a funnel-like guide.

Feasibly, each holding pin is held stationary in the carrier part or in the inner boundary and in the outer boundary in the assigned holes. In order to facilitate dismounting of the holding pin from the carrier part, it can be provided that, for each holding pin, coaxial through holes are formed in the opposite section of the carrier part, by which the holding pin which sits securely in its bearing holes can be knocked out by means of an arbor.

To prevent the opened locking means from locking unintentionally under the high spring force of the tensioning spring before a drill rod is attached, there can be a catch means for fixing the opened locking carrier on the carrier part in the catch position.

In order to facilitate replacement and fixation of different drill rods, in the aforementioned hollow drill, it is provided, in accordance with the invention, that the entry section has at least one side edge which is especially beveled and/or rounded and inclined to the axis of rotation. The inclined side edge supports the insertion of the locking means in the entry section when the drill rod is not exactly aligned when mounted on the interchangeable holder. The inclined side edge offers a funnel-like support which is improved by a configuration with two inclined or beveled side edges which lie opposite one another on the entry section. Feasibly, the entry section contains a locking section and the inclined side edge is opposite the locking section.

The angle between the beveled side edge and a line parallel to the axis of rotation is preferably roughly 30° to 45°, and if necessary, can be chosen to be smaller or larger.

One embodiment of the interchangeable holder with the drill rod of a hollow drill is explained in detail below with reference to the drawings.

BRIEF DESCRIPTION OF THE DRAWINGS

FIG. 1 shows in an axial top view, a interchangeable holder for hollow drills, three drill rods with different diameters being shown for illustration;

FIG. 2 is a sectional view taken along line A—A shown in FIG. 1;

FIG. 3 is an axial top view of a locking means of the interchangeable holder;

FIG. 4 is a sectional view taken along line B—B shown in FIG. 3;

FIG. 5 is a side view of the locking means shown in FIG. 3;

FIG. 6 is a side view of a drill rod with a recess formed on the base end of the drill rod for engagement for the locking means;

FIG. 7 is an axial top view of the base end of the drill rod shown in FIG. 5.

FIG. 8 shows a recess on the base end of the drill rod with a holding means and with a locking means in locking engagement in an enlarged side view; and FIG. 9 is a view similar to that of FIG. 8, but showing a modified locking tooth in locking engagement.

DETAILED DESCRIPTION OF THE INVENTION

A interchangeable holder 1 for hollow drills contains a shaft 2 (see FIGS. 1 and 2) with a central axial hole 3 and a disk-shaped axial carrier part 4 which is securely mounted on the shaft 2 and is made integral with it. The carrier part 4 has an annular recess 5 which is formed in the axial direction and which is bordered radially on the inside by the front end 6 of the shaft 2 and on the outside by a peripheral outside wall 7. The bottom of the recess 5 forms an annular, end contact surface 9 which is perpendicular to the axis 8 of rotation of the interchangeable holder 1 and against which the drill rod 10 of a hollow drill can be axially placed with its base end 11 which is opposite the drill tip. The diameter of the drill rod 10 which can be attached to the interchangeable holder 1 is in the range between the inside diameter of the outside wall 7 and the outside diameter of the front end 6 of the shaft 2. For example, in FIGS. 1 and 2, two different drill rods 10' and 10" are shown in addition, of which the drill rod 10' has a maximum possible diameter of, for example, 100 mm and adjoins the outside wall 7, while the drill rod 10" has a roughly minimum diameter of, for example, 40 mm and extends over the front end 6 of the shaft 2 with little play.

The interchangeable holder 1 contains three holding pins 12 which form a holding means for the drill rod 10 and which are aligned radially with respect to the axis 8 of rotation, are spaced uniformly apart from one another over the periphery and are securely mounted in the respective radial holes 13 on the front end 6 of the shaft 2 and in assigned radial holes 14 in the outside wall 7 of the carrier part 4. The three holding pins 12 are located in the plane which is parallel to the contact surface 9 and are spaced apart from the contact surface 9 (see FIG. 2). For each holding pin 12, coaxially to its bearing holes 13 and 14 in the opposing section of the carrier part 4 holes 13' and 14' are formed, through which the holding pin 12 can be knocked out by means of an arbor, if it would have to be replaced.

The drill rod 10 which is to be mounted on the interchangeable holder 1 contains on its base end 11 (see FIG. 6), three recesses 15 which are spaced uniformly over the periphery of the drill rod 10. Each recess 15 contains an entry section 17 which is opened toward the end face 16 of the base end 11, and a locking section 18 which extends from the entry section 17 as an undercut in the peripheral direction of the drill rod 10 and forms a locking projection 19 in the wall of the drill rod 10. The recesses 15 with their locking sections 18 and locking projections 19 together with the holding pins 12 form a holding means in the manner of a quarter-turn fastener. The entry section 17 is made tapered by a side edge 20 which is beveled in a top view and which is opposite the locking section 18 so that it is wider on the end opening than on its inner base 21.

The disk-shaped carrier part 4 on each holding pin 12 contains a slotted through opening 22 which offset in an axial top view is located next to the holding pin 12 and parallel to it, extends axially through the disk-shaped carrier part 4, reaches inside toward the axis 8 of rotation as far as the shaft 2 and on the outside as far as to or into the outside wall 7, and thus, extends over the annular contact surface 9. In each opening 22, a locking tooth 24, which projects from a locking carrier 23 in the axial direction, is movably held. The locking carrier 23 is formed to be disk-shaped and is movably arranged by means of a central bearing opening 25 on the shaft 2. A helical spring 26 which is supported on the shaft 2 pretensions the locking carrier 23 against the back 27 of the carrier part 4 in the locking position. By means of an annular holding collar 28 with an outside peripheral recess for manual control, the locking carrier 23 can be pushed manually against the tensioning force of the helical spring 26 out of the locked position as shown in FIG. 2 into the unlocked position, in which the locking teeth 24 are pulled back and their end faces 29 are arranged at least flat with the annular contact surface 9 or are set back from it. A pot-shaped cover sleeve 30, which is mounted on the shaft 2, covers the helical spring 26 and is surrounded by the holding collar 28 on the locking carrier 23.

For mounting and fixing a drill rod 10 on the interchangeable holder 1, first the locking carrier 23 is pulled back against the force of the helical spring 26 until the locking teeth 24 have been pulled completely out of the openings 22 in the carrier part 4. The locking carrier 23 can now be turned relative to the carrier part 4 so that the locking teeth 24 adjoin the back 27 of the carrier part 4 and the locking carrier 23 is held in the unlocked position. A journal 31 which projects from the end face 29 of one of the locking teeth 24 can fit into the assigned recess 32 on the back 27 of the carrier part 4 so that the locking carrier 23 is secured against unintentional turning in its unlocked position. The drill rod 10 which is designed for attachment is now moved with its base end 11 in this position against the contact surface 9 and is placed against it such that the holding pins 12 are inserted into the assigned recesses 15. If the drill rod 10 adjoins the contact surface 9, it is turned around its lengthwise axis until all the holding pins 12 are held in the respective locking sections 18 of the recesses 15. The three holding pins 12, which are arranged each offset by 120°, center the drill rod 10 on the carrier part 4. Then the locking carrier 23 is turned out of its catch position until the locking teeth 23 are located in front of the openings 22 and move jointly with the locking carrier 23 which is moved by spring force through it. Each locking tooth 23 moves into the entry section 17 of the recess 15, the insertion into the entry section 17 being supported by its bevels 33 on the end face 29 and by the beveled side edge 20. Furthermore, the beveled side edge 20 causes the drill rod 10 to be moved into its correct holding and locked position in which each holding pin 12 is held completely in the locking section 18 of the recess 15 if the drill rod 10 has not already been moved into this correct position in the above described contact with the contact surface 9.

In the final holding and locking position (see FIGS. 2 and 8), the drill rod 10 is held by the holding pins 12 in the quarter-turn lock and is protected against turning by the locking teeth 24. The drilling forces which occur on the drill rod 10 in the peripheral direction act such that the holding pins 12 continue to be pressed into the locking sections 18. The peripheral forces which occur when the drill rod 10 is rotated against the drill direction are supported by the locking teeth 24 so that the drill rod 10 can neither loosen nor release from its fixation on the carrier part 4.

To remove the drill rod 10, in the aforementioned manner, the locking carrier 23 pulls the locking teeth 24 out of their locking engagement in the recesses 15 so that the drill rod 10 is turned relative to the carrier part 4 and the holding pins 12 and can be removed from the carrier part 4 and the interchangeable holder 1.

One alternative configuration of the locking teeth 23 is shown in FIG. 9. The locking tooth 24 contains a shaft 34 with reduced thickness and a head 35 with a bead 36 which projects laterally against the holding pin 12 and in the locked position adjoins it. The shaft 34 is held with play 34 in the opening 22; this prevents the fine drilled material from jamming the locking tooth 24 in the opening 22.

Drilled material can be removed, for example, via a suction fan which is connected to the interchangeable holder 1 and which can exhaust the drilled material, for example, via openings 37 in the hollow shaft 2.

The beveled side edge 20 of the recess 15 is formed either over the entire depth of the entry section 17 (see FIGS. 6 and 8) or it forms only a front, funnel-like insertion bevel of the left side of the entry section 17, which side runs then parallel to the axis 8 of rotation or the lengthwise axis of the drill rod 10 (see FIG. 9). A comparable bevel can also be formed on the right side of the entry section 17 in order to improve the funnel action when the locking tooth 24 is inserted.

The angle $\alpha$ between the beveled side edge 20 and the line parallel to the axis 8 of rotation is preferably roughly 30° to 45°, but if necessary it can also be chosen to be smaller or larger.

The described interchangeable holder is suitable for hollow drills for different materials such as concrete, tile, wood or metal and can be mounted on the shaft 2 on the drilling machine by a connecting means 38, for example a screw thread.

The invention claimed is:

1. Interchangeable holder for hollow drills, comprising:
   a carrier part for end accommodation of a base end of a drill rod of a hollow drill, and
   a holding means for retaining the base end of the drill rod against an annular contact area of the carrier part, said holding means engaging in respective recesses in a wall of the drill rod at said base end, wherein
   the drill rods have base ends of different diameters and the annular contact area is of a size which can accommodate the different diameter base ends of drill rods and
   a locking means for keeping the drill rod locked in a centered position together with the holding means is provided, the locking means being active over the width of the annular contact area.

2. Interchangeable holder as claimed in claim 1, wherein the holding means has at least two essentially radially arranged holding pins for bayonet retaining engagement in the respective recesses in the base end of the drill rod.

3. Interchangeable holder as claimed in claim 1, wherein the holding means has three essentially radially arranged holding pins for bayonet retaining engagement in the respective recesses in the base end of the drill rod.

4. Interchangeable holder as claimed in claim 2, wherein the locking means contains a movable locking tooth for each holding pin, and wherein the locking teeth for locking the drill rods held by the holding pins is extendable into the recesses.

5. Interchangeable holder as claimed in claim 4, wherein each locking tooth extends approximately over a free length of the holding pin and is extendable through a slotted opening which has been formed in the contact surface of the carrier part in an axial direction into a position which borders the holding pin.

6. Interchangeable holder as claimed in claim 4, wherein the annular contact area of the carrier part is bordered by an outer boundary and an inner boundary, each of the holding pins being supported on the outside boundary and the inside boundary and each locking tooth extending in an arrangement which is offset parallel to the respective holding pin approximately over a free length of the holding pin.

7. Interchangeable holder as claimed in claim 1, wherein a locking carrier is supported to be axially movable on a central shaft of the carrier part and contains the locking means.

8. Interchangeable holder as claimed in claim 7, wherein the locking carrier is elastically pre-tensioned against the carrier part in a locked position.

9. Interchangeable holder as claimed in claim 4, wherein each locking tooth is rounded or beveled towards an end face thereof.

10. Interchangeable holder as claimed in claims 4, wherein each recess on the drill rod has an entry section for the holding pin and the locking tooth, and wherein the entry section has at least one side edge which is inclined towards a direction of motion of the locking tooth.

11. Interchangeable holder as claimed in claim 2, wherein each holding pin is held stationary in the carrier part in a respective hole.

12. Interchangeable holder as claimed in claim 11, wherein a coaxial through hole is formed for each holding pin in an opposite section of the carrier part.

13. Interchangeable holder as claimed in claim 7, wherein there is a catch means for fixing the locking carrier on the carrier part in a catch position when the locking carrier is in an opened position.

14. Interchangeable holder as claimed in claim 1, wherein the carrier has a shaft and wherein the shaft has a connection for a drive means.

15. Interchangeable holder as claimed in claim 1, wherein the carrier has a shaft and wherein the shaft is hollow and has a suction connection.

16. Hollow drill for fixing on an interchangeable holder, the hollow drill having a drill rod with a drill tip and a base end opposite the drill tip, recesses being provided on the base end for producing a bayonet retaining engagement with holding means of the interchangeable holder, each recess having an entry section for the holding means connected to an inner locking section which extends in a plane that is perpendicular to an axis of rotation of the drill rod wherein the entry section has a first side edge that is closest to the locking section and which runs parallel to the axis of rotation of the drill rod and has a second side edge that is inclined at least in part relative to the axis of rotation of the drill rod in a direction toward the locking section such that the holding means travel in a single circumferential direction along the entry section and into the inner locking section.

17. Hollow drill as claimed in claim 16, wherein the inclined second side edge is at least one of beveled and rounded.

18. Hollow drill as claimed in claim 16, wherein the entry section contains a locking section and the inclined second side edge is opposite the locking section.

* * * * *